(12) United States Patent
Riley et al.

(10) Patent No.: US 6,748,848 B1
(45) Date of Patent: Jun. 15, 2004

(54) WASTE GATE VALVE ACTUATOR

(75) Inventors: David D. Riley, Creston, IA (US); Daryl A. Lilly, Creston, IA (US)

(73) Assignee: Gits Manufacturing Company, LLC, Creston, IA (US)

( * ) Notice: Subject to any disclaimer, the term of this patent is extended or adjusted under 35 U.S.C. 154(b) by 0 days.

(21) Appl. No.: 10/316,268

(22) Filed: Dec. 11, 2002

(51) Int. Cl.[7] .................. F01B 19/00; F02D 23/00
(52) U.S. Cl. .................. 92/103 R; 92/103 SD; 92/168; 60/602; 428/161
(58) Field of Search .................. 60/602; 92/103 R, 92/168, 103 SD; 428/161

(56) References Cited

U.S. PATENT DOCUMENTS

| | | | |
|---|---|---|---|
| 2,615,471 A | 10/1952 | McFarland, Jr. | |
| 2,710,629 A | 6/1955 | Price | |
| 2,730,131 A | 1/1956 | Asp et al. | |
| 2,918,089 A | 12/1959 | McFarland, Jr. | |
| 2,947,325 A | 8/1960 | McFarland, Jr. | |
| 3,673,369 A | * 6/1972 | Weaver | 92/102 |
| 4,377,070 A | 3/1983 | Shadbourne | 60/602 |
| 4,403,538 A | 9/1983 | Rise | |
| 4,864,918 A | 9/1989 | Martin | |
| 5,046,317 A | 9/1991 | Satokawa | |
| 5,487,273 A | 1/1996 | Elpern et al. | 60/602 |
| 5,586,744 A | 12/1996 | Smith et al. | |
| 5,699,717 A | * 12/1997 | Riedlinger | 92/103 R |
| 5,950,523 A | * 9/1999 | Reynolds | 92/103 R |
| 6,080,685 A | 6/2000 | Eady | |
| 6,138,550 A | * 10/2000 | Fingar et al. | 92/103 R |
| 6,155,048 A | 12/2000 | Vertanen | |
| 6,189,435 B1 | 2/2001 | Vertanen et al. | 92/103 R |
| 6,458,446 B1 | * 10/2002 | Andronaco et al. | 428/161 |

FOREIGN PATENT DOCUMENTS

| | | | | |
|---|---|---|---|---|
| JP | 55049525 A | * | 4/1980 | 60/602 |
| JP | 07208407 A | * | 8/1995 | F15B/15/10 |

* cited by examiner

Primary Examiner—Thomas Denion
Assistant Examiner—Thai Ba Trieu
(74) Attorney, Agent, or Firm—Daniel A. Rosenberg; Kent A. Herink; Davis, Brown, Koehn, Shors & Roberts, P.C.

(57) ABSTRACT

A waste gate valve actuator is provided for use with a turbocharger having a flexible and durable thin non-fabric diaphragm substantially uniform in thickness comprised entirely of a thermoset or thermoplastic fluorocarbon material.

4 Claims, 3 Drawing Sheets

WASTE GATE VALVE ACTUATOR

BACKGROUND OF THE INVENTION

1. Field of the Invention

The present invention relates to a waste gate valve actuator for a turbocharger, and in particular to a waste gate valve actuator for a turbocharger having a fabricless diaphragm with certain other unique and advantageous properties.

2. Background

Turbochargers are commonly used with various types of engines for the purpose of providing a relatively high pressure charge of a fluid or gas, like air, to an internal combustion engine. The turbocharger operates in conjunction with the engine, typically by channeling engine exhaust gas from the engine into a rotateably driven compressor that in turn drives a compressor for compressing air or fluid for return to the engine. The return flow boosts the power of the engine, which among other things increases the flow exhaust gas to the turbocharger.

Thus, the speed of the turbocharger increases as the speed of the engine that it supports increases. This feedback loop can create an overload condition for either the turbocharger or the engine. In other words, safe operation of the engine and turbocharger requires a mechanism for the controlled release of pressure under extreme operating conditions to prevent damage to the system. The prior art teaches the use of a variety of devices to limit the rotational capacity of the turbocharger compressor, and thereby the amount of boost provided to the engine by the turbocharger. These devices include compressor inlet control valves, turbine bypass mechanism, blow-off valves, and waste gate valves. In each case the operation of the various devices includes the use of a pressure selective device divert some portion of the exhaust gas that drives the turbocharger to an alternative passageway.

In particular, waste gate valves open and close a passage way that diverts some portion of the exhaust gas away from the turbine or compressor. Thus, under load conditions that approach excessive levels a sufficient portion of the exhaust gas that drives the turbine flows through a bypass route thereby interrupting the feedback loop to avert dangerous operating conditions. In this manner, the boost pressure that the turbocharger provides to the engine is capped at predetermined maximum level to avoid damage to the engine or turbocharger.

Waste gate valves are controlled by a waste gate valve actuator, which is designed to open and/or close the valve under certain predetermined conditions. The actuator typically includes a housing that surrounds a pressure driven piston and depending rod, the motion of which opens and closes the waste gate valve. A resilient diaphragm is flexibly captured within interior of the housing. An inlet pressure source provides pressure to the actuator in proportion to the pressure levels of the exhaust gas that feeds the turbocharger. A spring provides selective resistance to the pressure and under normal conditions biases the diaphragm to a position that closes the bypass route. When the pressure builds to a maximum predetermined level during heavy load conditions, the pressure in the actuator overcomes the biasing force of the spring and displaces the diaphragm a sufficient distance to move the piston and rod enough to trigger the waste gate valve to allow the diversion of some portion of the exhaust gas.

In operation, the waste gate actuator undergoes substantial stress due to the nature of the conditions under which the turbocharger operates. In addition to the normal wear and tear associated with engines, the exhaust gases have corrosive properties that tend to deteriorate the diaphragm. Another important source of stress particularly on waste gate actuator diaphragms comprises operational vibration. Vibration can cause the edges of the diaphragm nearest to the housing to prematurely wear through contact between the diaphragm and the housing. Perhaps even more importantly, the repetitive operational displacement of the diaphragm comprises a substantial influence on the deterioration and subsequent failure of diaphragms. Thus, the diaphragm must both be flexible and durable, which has proved a troublesome combination for prior art designs. In particular, many prior art diaphragms for waste gate actuators are comprised of a combination of a proprietary fabric material like Nomex® and a thermoplastic or rubber material. The former provides flexibility while the latter provides durability. However, in practice even this design is subject to failure through repetitive use. Also, the combination is expensive and difficult to manufacture due to the combination of the two materials and the expensive of the woven fabric like materials. Other prior art attempts to improve the useful life of waste gate actuator diaphragms include increasing the thickness to improve durability, however, this comes at the expense of flexibility. In addition, some prior art diaphragms selectively vary the thickness of the diaphragm in order to strengthen those portions that are most susceptible to failure. This approach, however, increases the cost and difficulty of manufacture.

Thus, a need exists for an improved diaphragm for a turbocharger waste gate valve actuator.

SUMMARY OF THE INVENTION

An object of the present invention comprises providing a waste gate valve actuator for use with a turbocharger having a flexible and durable thin non-fabric diaphragm substantially uniform in thickness.

These and other objects of the present invention will become apparent to those skilled in the art upon reference to the following specification, drawings, and claims.

The present invention intends to overcome the difficulties encountered heretofore. To that end, a waste gate valve actuator is provided for use with a turbocharger having a flexible and durable thin non-fabric diaphragm substantially uniform in thickness. The actuator comprises a cover and a bottom can joined at a crimp to the cover to form an interior cavity. A piston is located in the interior of the actuator comprising a piston cup located at an upper end and a rod depending downward to a lower end. A spring is captured between the piston cup and the bottom can for exerting a biasing force on the piston. Also provided is a non-fabric durable and flexible diaphragm of substantially uniform thickness, with a crimp end for air tight securement within the crimp, a top, and a convoluted side therebetween, wherein the diaphragm divides the interior of the actuator into an upper pressure chamber and a lower chamber at atmosphere with the piston located in the lower chamber. An air inlet introduces a pressurized substance into the pressure chamber whereby the introduction of a sufficient amount of the pressurized substance will exert sufficient pressure on the diaphragm to overcome the biasing force of the spring and force the piston downward a sufficient distance to actuate the waste gate valve of the turbocharger.

BRIEF DESCRIPTION OF THE DRAWINGS

FIG. 1b shows a side cross sectional view of the waste gate valve actuator taken along the line A—A shown in FIG. 1a.

FIG. 2b is a side cross sectional view of the diaphragm taken along the line A—A shown in FIG. 2a.

DETAILED DESCRIPTION OF THE INVENTION

Figure 1A:
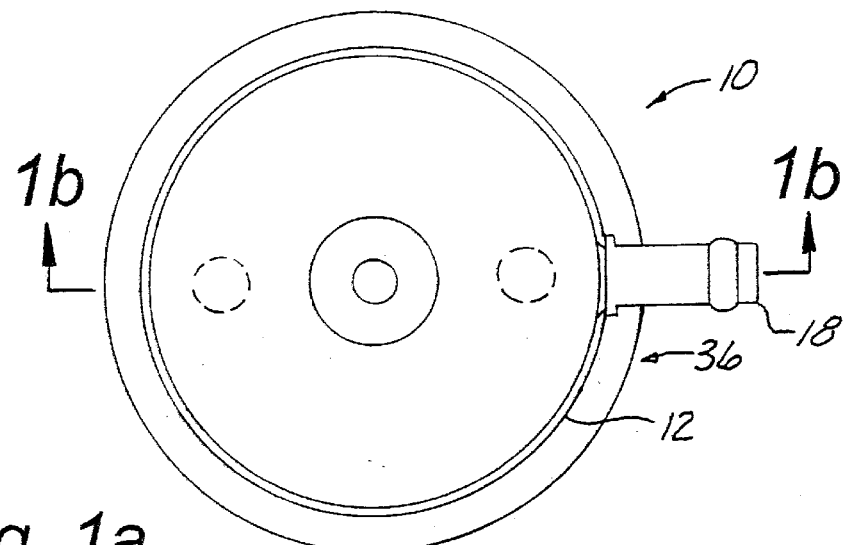
FIG. 1a shows a top view of a waste gate valve actuator for a turbocharger.
Figure 3:
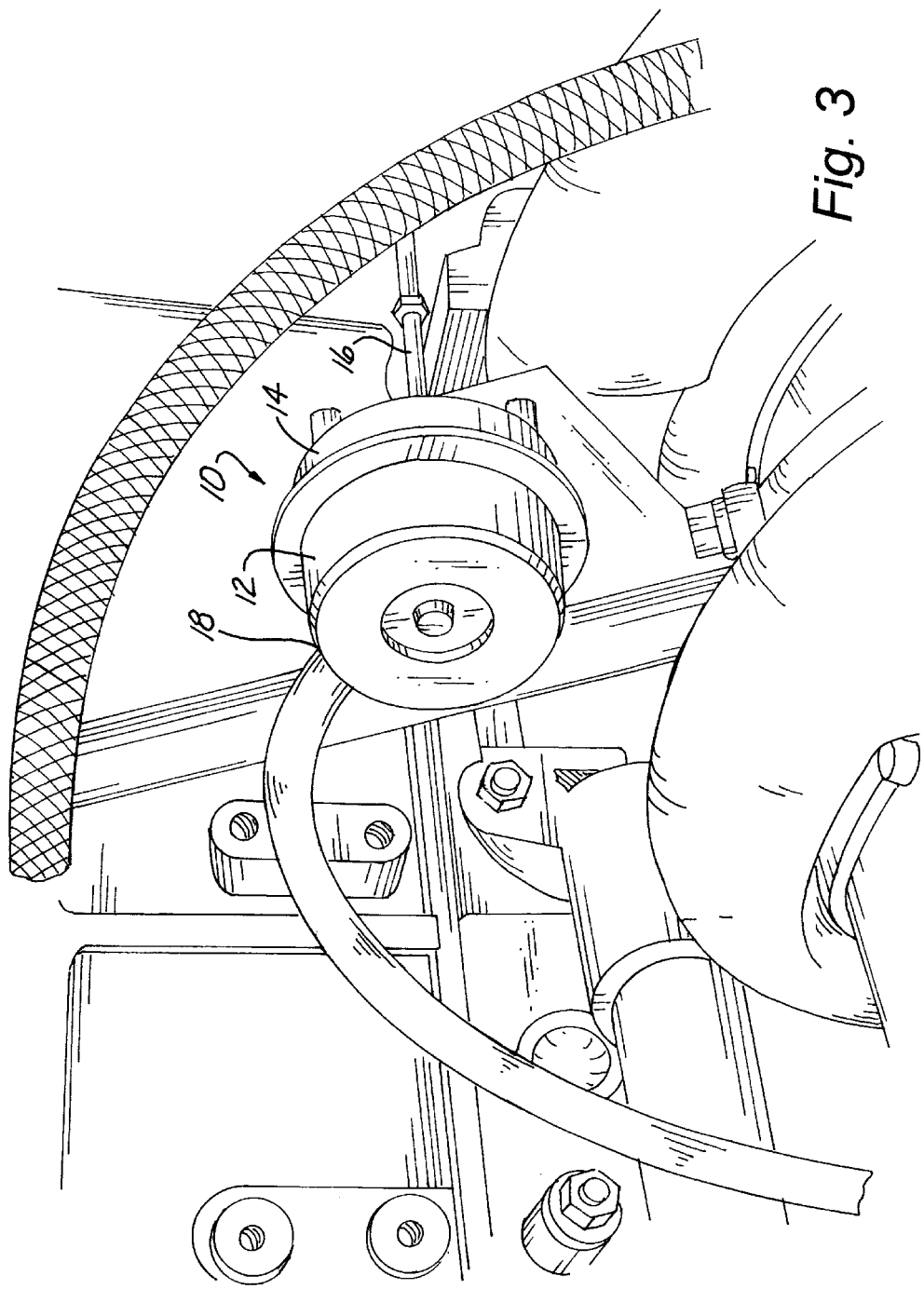
FIG. 3 is a reproduction of a photograph of the waste gate actuator in operational position on the turbocharger.

In the Figure, FIG. 1 shows a waste gate valve actuator 10 for a turbocharger (shown partially in FIG. 3). The actuator 10 comprises a cover 12 and bottom can 14 that define the perimeter and interior of the actuator 10. The cover 12 and bottom can 14 are joined by crimp 36 extending around the circumference of the actuator 10, whereby an upward extending portion 46 of an outward lip 50 on the bottom can 14 is crimped downward and around a mating lip 48 on the cover 12 to from the circumferential crimp 36.

The interior of the actuator 10 is divided in two generally by a diaphragm 22 into a pressure chamber 20 and a lower chamber 5 at atmosphere. An air inlet 18 provides a fluid communication port of the introduction into the pressure chamber 20 of a pressurized substance like air, engine exhaust, and the like.

The interior of the actuator 10 also includes a piston 15 with a piston rod 16 descending downward therefrom. The piston 15 at its upward end further comprises a piston cup 30 to define a top of the piston 15. A washer 28 comprises the actual point of contract between upward end of the piston 15 and the piston cup 30. A piston rod 16 extends downward from the piston 15 and out of the bottom of the actuator 10 for connection to a lever (not shown) or similar device for the purpose of operating a waste gate valve (not shown). A spring 26 is located within the interior of the lower chamber 5 of the actuator 10, and is secured on its upward end within the piston cup 30 and is captured at its lower end by a cup shaped liner 34 located along the bottom of the can 14.

Finally, threaded leads 32 extend downward from the bottom of the can 14 of the actuator and allow for securement of the actuator 10 through the attachment of treaded bolts (not shown).

Figure 1B:
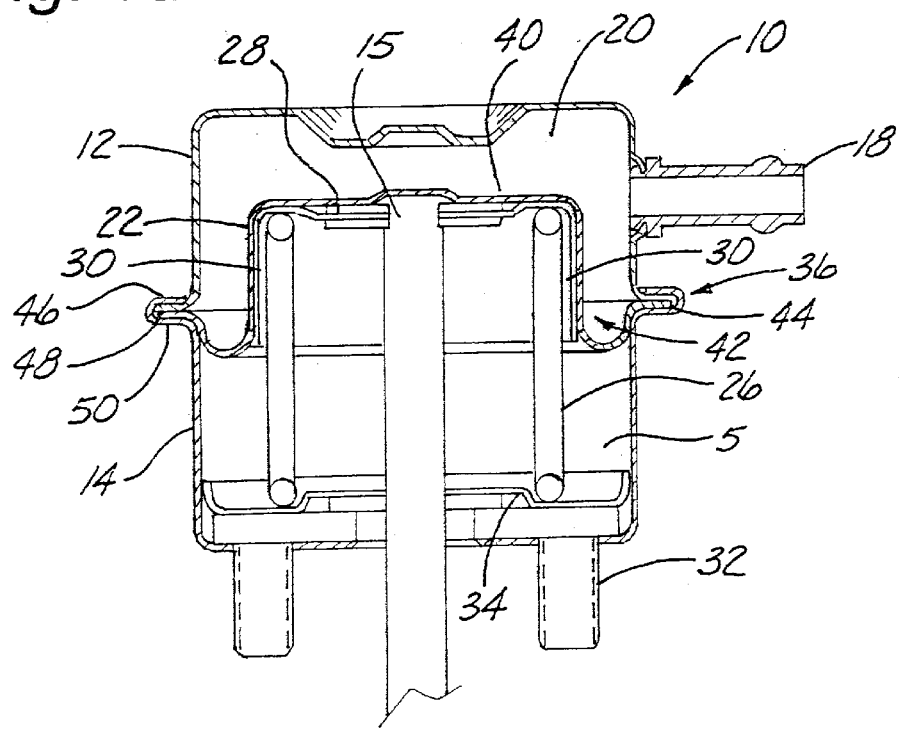

Returning now to the diaphragm 22, as shown best in FIG. 1b, the diaphragm 22 is flexibly secured within the interior of the actuator 10 at the crimp 36. In particular, a crimp end 44 of the diaphragm 22 fits between the lip 48 of the cover 12 and the bottom of the lip 50 of the bottom can 14. This point of connection is sufficiently secure to ensure that the pressure chamber 20 remains air tight. Otherwise, the diaphragm 22 generally conforms in shape to the piston cup 30, with the exception of a portion of a convoluted side 42.

In operation, a pressurized substance enters the pressure chamber 20 and exerts a downward pressure on the piston 15, which is resisted by the upward biasing force of the spring 26. However, once the pressure in the pressure chamber 20 overcomes the resistance of the spring 26, the piston 15 is forced downward through the rolling of the convoluted side 42 of the diaphragm 22. Eventually, the piston rod 16 is displaced downward a sufficient distance to actuate the waste gate valve. As noted hereinabove, the waste gate valve opens a route to bypass the turbocharger compressor thereby limiting the boost power to the engine and in turn limiting the inlet pressure enough to allow the waste gate valve to under the biasing force of the spring 26. Upon closing, the spring 26 returns the diaphragm 22 to its neutral position by reversing the roll of the convoluted side 42 of the diaphragm 22.

Figure 2A:
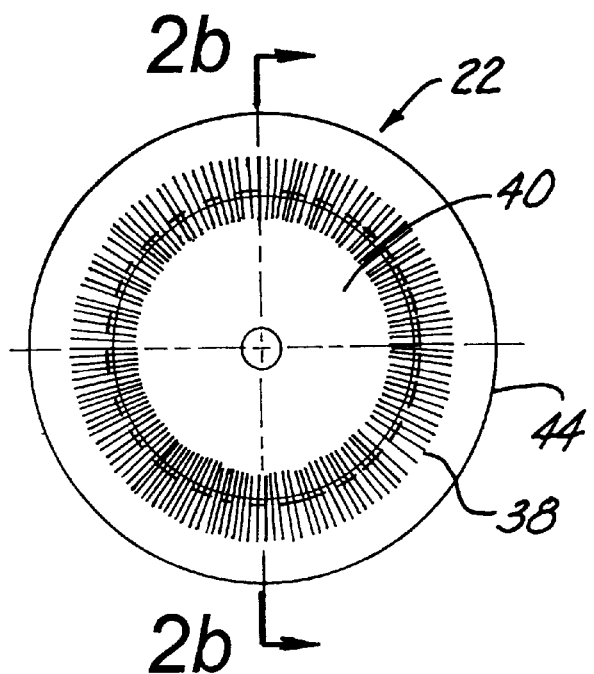
FIG. 2a is a bottom view of a diaphragm of the waste gate valve actuator.
Figure 2B:
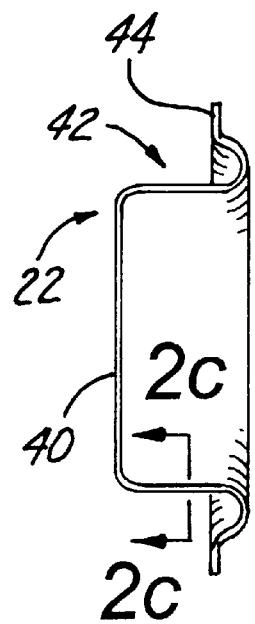
Figure 2C:
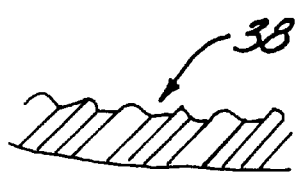
FIG. 2c is a cross sectional view of a ribbed portion of the diaphragm taken along the line B—B shown in FIG. 2b.

FIGS. 2a–c show in detail the construction of the diaphragm 22, which is a diaphragm type commonly referred to as a convoluted diaphragm. The diaphragm 22 is comprised entirely of a thermoset fluorocarbon material, and is substantially uniform in thickness. The material used for construction of the diaphragm 22 is sufficiently rubber like, or pliant, to provide the required resilience while at the same time is satisfactorily durable. The diaphragm as will be described in detail hereinbelow is not only substantially uniform in thickness but is comparatively thin. It has been found for example that diaphragms constructed of thermoplastic materials cannot provide the required combination of resilience and durability. The diaphragm 22 of the present invention has the advantage of eliminating the need for composite construction common to prior art diaphragms, and in particular eliminating the use of a fabric combination diaphragm. Also, the diaphragm 22 can be more easily and inexpensively manufactured by virtue of its substantialy uniform thickness and is relative thin in profile. In detail, the top 40 of the diaphragm 22 varies between 0.022 and 0.030 inches in thickness, and the convoluted side 32 varies between 0.017 and 0.022 inches in thickness. Thus, the top 40 and convoluted side 32 can be a uniform thickness if desired, but in any event are substantially of the same thickness. The crimp end 44 of the diaphragm 22, however, is of a slightly greater thickness of between 0.034 and 0.041 inches to support the pressure of the crimp 36. In addition, the interior of the convoluted side 42 that lies between the line C—C shown in FIG. 2b is ribbed for additional strength. As shown in FIG. 2c the ribs 38 vary in height from between 0.004 and 0.008 inches.

In the preferred embodiment, the diaphragm 22 in its neutral state is 2.244 inches between the crimp ends 44, and the top is 1.438 inches in diameter. Of course, those of ordinary skill in the art will understand that the size of the diaphragm 22 can and will vary depending on the desired application. For example, the convoluted side 42 of the diaphragm 22 is 0.646 inches form top to bottom, and between 0.495 and 0.522 inches from the top 40 and the crimp end 44. The design of the convoluted side 42, or course, will vary depending on the necessary stroke of the piston rod 16 needed to actuator the waste gate valve.

The waste gate valve actuator 10 and its internal diaphragm 22 substantially eliminate the problems of the prior art by providing for the use of a diaphragm 22 that is of a uniform non-composite design which eliminates the need for the use of an expensive fabric material like Nomex. Furthermore, the substantially uniform thickness and general thin nature of the diaphragm allows for easier and less expensive manufacturing. The present invention accomplishes these advantages while not sacrificing either resilience or durability over the prior art design. In fact, it is believed that the actuator 10 incorporating the diaphragm 22 is superior in both aspects of prior art diaphragms.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

What is claimed:

1. A waste gate valve actuator for use with a turbocharger having a flexible and durable thin non-fabric diaphragm substantially uniform in thickness, said actuator comprising:

a cover;

a bottom can joined at a crimp to said cover to form an interior cavity;

a piston located in said interior of said actuator comprising a piston cup located at an upper end and a rod depending downward to a lower end;

a spring captured between said piston cup and said bottom can for exerting a biasing force on said piston and said diaphragm;

a non-fabric durable and flexible diaphragm of substantially uniform thickness comprised entirely of a thermoset or thermoplastic fluorocarbon material, with a crimp end for air tight securement within said crimp, a top, and a convoluted side therebetween, wherein the diaphragm divides said interior of said actuator into an upper pressure chamber and a lower chamber at atmosphere with said piston located in said lower chamber;

an air inlet for the introduction of a pressurized substance into said pressure chamber whereby the introduction of a sufficient amount of said pressurized substance will exert sufficient pressure on said diaphragm and said piston to overcome the biasing force of said spring and force said piston downward a sufficient distance to actuate the waste gate valve of the turbocharger.

2. The invention in accordance with claim 1 wherein said diaphragm is a convoluted diaphragm.

3. The invention in accordance with claim 1 wherein said convoluted side of said diaphragm includes strengthening ribs.

4. The invention in accordance with claim 1 wherein said diaphragm in substantial portion is about 0.022 inches thick.

* * * * *